United States Patent
Springston, Jr. et al.

[15] 3,677,082
[45] July 18, 1972

[54] KNOTMETER FOR SMALL CRAFT

[72] Inventors: George B. Springston, Jr., Bethesda; Samuel L. Thomas, Gaithersburg; Fred B. Miller, Rockville, all of Md.

[73] Assignee: The United States of America as represented by the Secretary of the Navy

[22] Filed: Nov. 30, 1970

[21] Appl. No.: 93,673

[52] U.S. Cl. ................................. 73/181, 73/194 EM
[51] Int. Cl. ........................................... G01c 21/00
[58] Field of Search ................. 73/181, 194; 324/99 R

[56] References Cited

UNITED STATES PATENTS

| | | |
|---|---|---|
| 3,362,221 | 1/1968 | Eller et al. ..................... 73/194 EM |
| 3,385,107 | 5/1968 | Hutcheon et al. ............... 73/194 EM |
| 3,368,149 | 2/1968 | Wasserman ......................... 329/99 R |
| 3,114,260 | 12/1963 | Soller et al. .......................... 73/181 |

*Primary Examiner*—Donald O. Woodiel
*Attorney*—R. S. Sciascia, Q. E. Hodges and R. M. Wohlfarth

[57] ABSTRACT

A regulated source of power is used to set up a magnetic field in the water around a rodmeter. The output is fed to an amplifier which in turn is connected to a ring demodulator which produces a pulsating D.C. voltage. A capacitor smoothes the D.C. output and feeds it to an integrating digital voltmeter to provide a display which is proportional to the average speed of the craft through the water.

2 Claims, 3 Drawing Figures

FIG. I.

INVENTORS
GEORGE B. SPRINGSTON, Jr.
SAMUEL L. THOMAS
BY FRED B. MILLER
ATTORNEYS

KNOTMETER FOR SMALL CRAFT

The invention described herein may be manufactured and used by or for the Government of the United States of America for Governmental purposes without the payment of any royalties thereon or therefor.

BACKGROUND OF THE INVENTION

1. Field of the Invention

The measurement of ship's speed through the water during hydrodynamic evaluation trials produces data which are useful in correlating other measurements such as roll, pitch, heave, thrust, torque, horsepower, and shaft rpm. For many years electromagnetic log equipment has been used as standard equipment on most large high-speed military ships. As a speed-measurement system for general operation and navigation of ships, its performance is adequate. However, a small unit that can be used in smaller craft is required, but with the same need for accuracy found in the large shipboard units. Also, in order to be readily usable to evaluate sea trails, the data should be displayed to the operator of the craft and be recorded or presented at the same time in a form that can be handled by a computer.

Small craft are susceptable to various sea states since they experience a great amount of relative up and down motion causing fluctuation in the speed information data. To alleviate this difficulty, a time-averaged value of the speed data can be provided rather than the instantaneous value given by a standard Navy log system.

2. Description of the Prior Art

Present speed-measurement devices fall into two categories; large shipboard units with acceptable accuracy levels, and small units capable of mounting on small boats but generally lacking accuracy. In addition, neither category of units provide a speed-averaging capability which is critical in rough-water conditions.

Further, most speed-measuring devices do not provide a permanent record of the data, and of those that do, the data are not compatible with modern electronic computers. Also, error can be introduced into the data if other electrical equipment on board the craft operates at the same frequency as the rodmeter, thereby setting up electrical fields with interference therefrom causing the error.

SUMMARY OF THE INVENTION

The standard Navy rodmeter has proven to be an adequate sensor when used with an all semiconductor electronic system. The invention eliminates the use of a null-balance servo-system thereby reducing the size and weight of the unit but without sacrificing the the accuracy or resolution of the standard system. The power source that provides excitation for the standard sensor is 70 Hz. in the preferred embodiment of the invention, to preclude interference from shipboard equipment at 60 Hz. The invention incorporates amplification and demodulation circuitry with inherently high interference rejection, with the data output suitable for recording on magnetic tape which is compatible with modern electronic computers. Further, the gain of the amplifiers is adjustable so that the output can be used to provide a digital display of the craft speed directly in knots for the operator.

DESCRIPTION OF THE INVENTION

Figure 1:
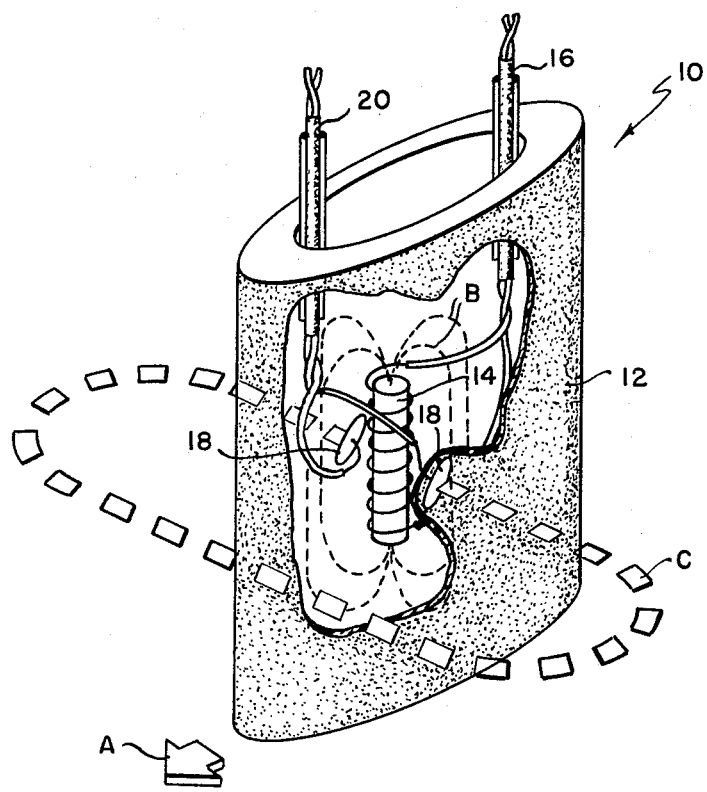
FIG. 1 is a perspective view of the sensor used in the invention with parts cut away for clarity.
Figure 2:
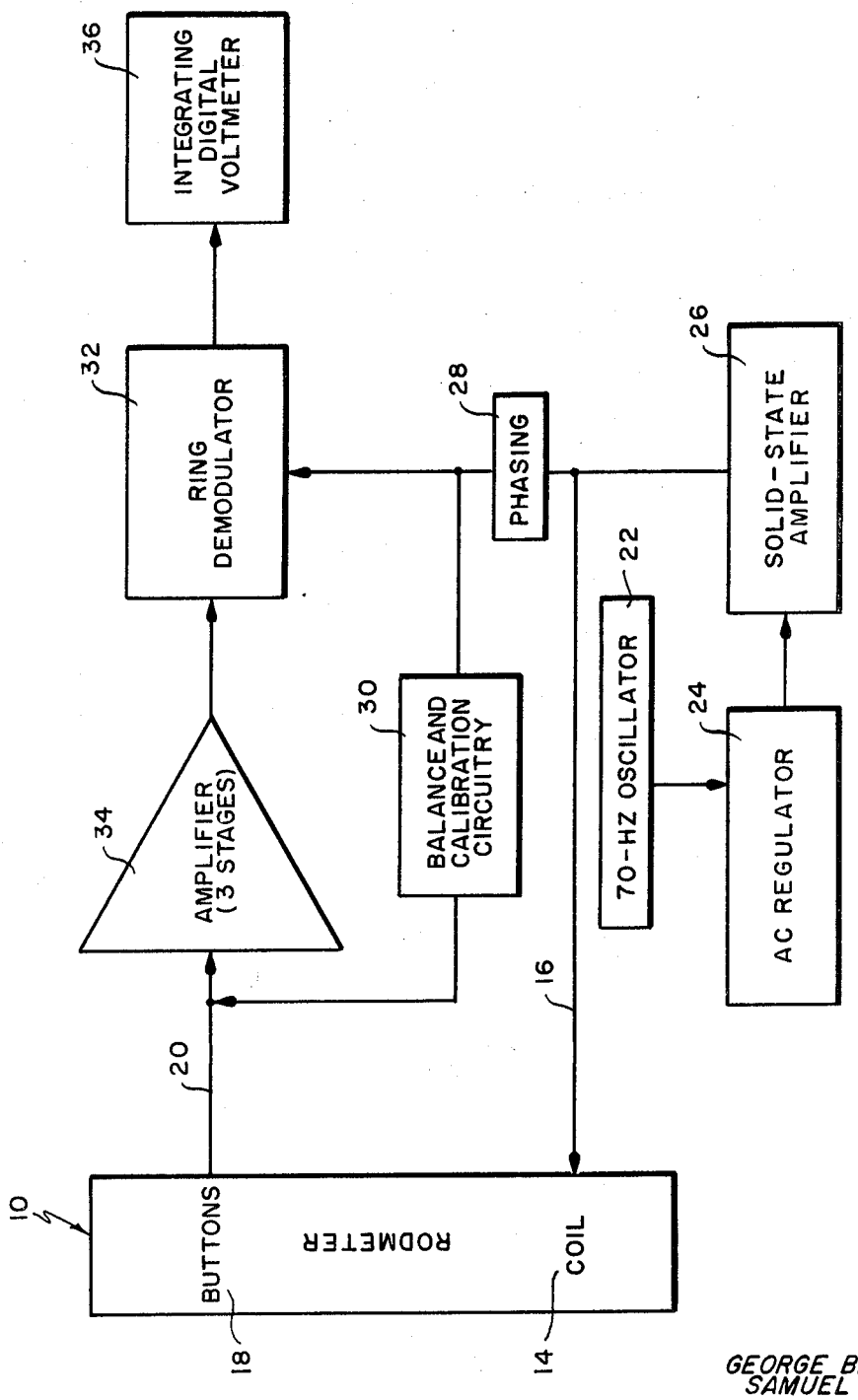
FIG. 2 is a block diagram of the system embodying the invention.

Referring now to the drawings, the rodmeter or sensor 10 is shown in FIG. 1 which is connected into the system embodying the invention as shown in FIG. 2.

The sensor 10 has a streamlined body or housing 12 in which is mounted a coil 14. A convenient method of mounting is to pot the coil 14 within the housing 12. A cable 16 connects the coil 14 to its power source. A pair of stainless steel buttons 18 are the pickups to provide the input to the system. A cable 20 connects the buttons 18 into the system. The direction of movement of the sensor 10 through the water is indicated by the arrow A, with the alternating magnetic field set up by the excitation of the coil 14 being shown by the dashed lines B. The magnetic field B causes a voltage to be induced in a water circuit which is shown at C which is measured across the buttons 18. The voltage is in phase with the current used to excite the coil but is approximately 90° out of phase with the excitation voltage. The voltage measured across the buttons 18 is directly proportional to the motion of the sensor through the water. This is well known in the art as shown in the U.S. Pats. to Soller et al., No. 3,114,260 and Snyder et al., No. 2,969,673.

The connection of the rodmeter 10 into the system is shown in FIG. 2 wherein an oscillator 22 is used to provide a 70 Hz signal of about 5 volts rms. The signal is then fed to a regulator 24 and an amplifier 26 to produce an amplitude output of approximately 25 volts rms with a power output of approximately 20 watts to drive the coil 14.

The output of amplifier 26 and regulator 24 is also fed to a phasing network 28 so that the output voltage is in phase with the voltage from the pickup buttons 18. This phased voltage is then used as the balancing and calibration voltage in the balance and calibration circuitry 30 and as in injected carrier for the ring demodulator 32. The voltage from the pickup buttons 18 and the voltage from the balance and calibration circuitry 30 are then applied to the three-stage amplifier 34. The component of the amplified signal from 34 which is in phase with the injected carrier from the phasing network 28 is then rectified by the ring demodulator 32. The ring demodulator has excellent rejection characteristics for spurious signals, which is further enhanced when the signal is averaged over a 10-second period by an integrating digital voltmeter 36. The use of the voltmeter 36 automatically results in binary-coded decimal data which can either be recorded on tape along with other parameters or fed into a computer.

Figure 3:
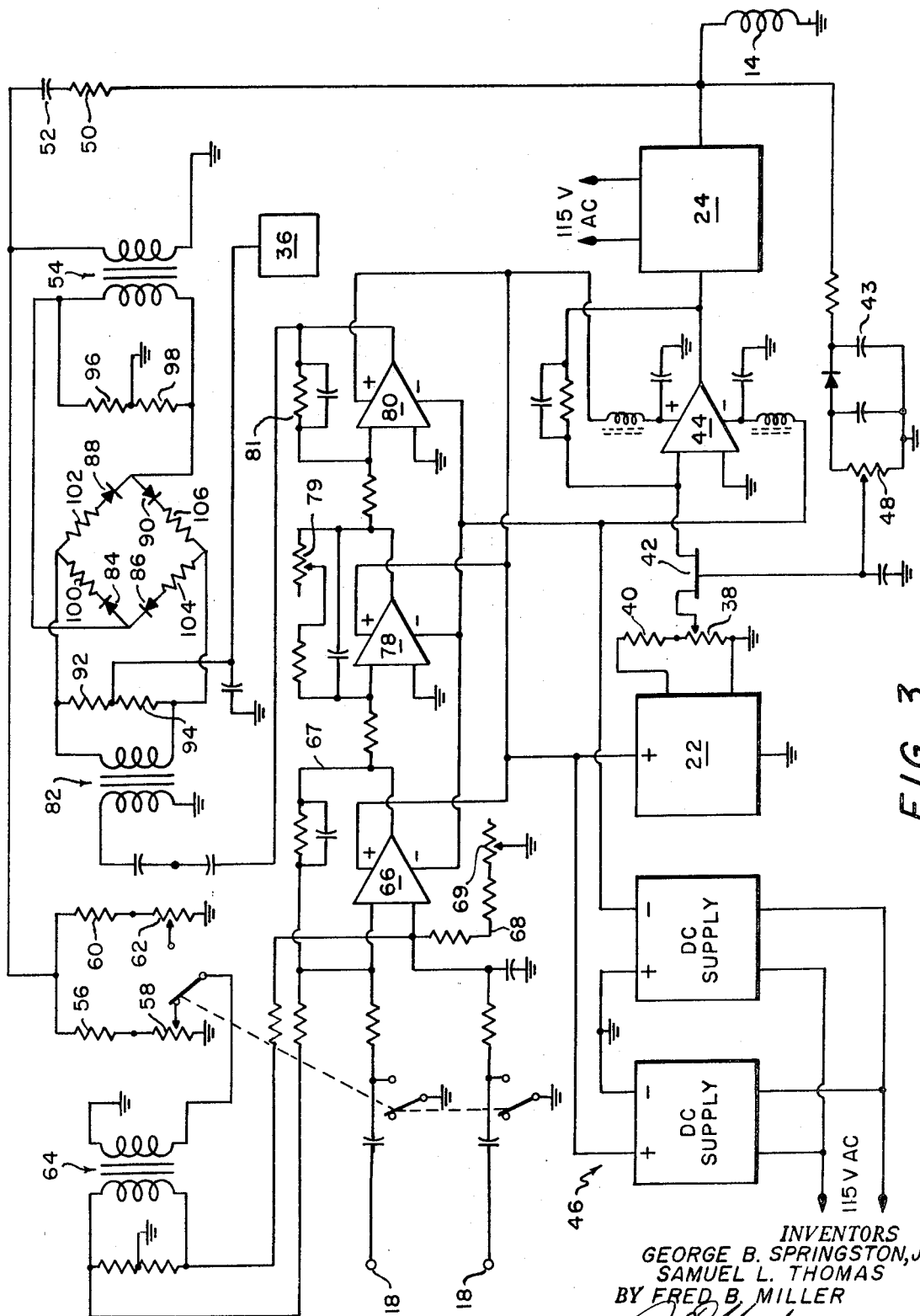
FIG. 3 is a schematic diagram of the system embodying the invention.

Referring now to the schematic of the system in FIG. 3, the excitation or carrier for the system is generated by a crystal-controlled 70 Hz oscillator 22, which can be a commercially available type, such as the Connor-Winfield Type S21ON. The signal generated by oscillator 22 is about 5 volts rms and is attenuated by a resistive network consisting of potentiometer 38 and resistor 40. The attenuated signal is fed to the source of a junction field-effect transistor 42 which functions as a voltage-variable resistor. This transistor is the gain-controlling element in operational amplifier 44 of the regulator 24, operational amplifier 44 can be the commercially available Philbrick Type P65AU. The drain of the field-effect transistor 42 is connected to the negative input of operational amplifier 44 whose output forms the drive signal for power amplifier 24, for example the commercially available Knight Model 3221T. The power amplifier 24 is used to raise the amplitude of the output of regulator amplifier 44 from approximately 0.15 volt rms to 25 volts rms with a power output of approximately 20 watts to drive the sensor coil 14. The power for amplifier 24 comes directly from a 115 volt AC power source. Power for the remainder of the system is supplied by two D.C. power supply modules 46 producing ±15 volts with respect to ground.

The output of power amplifier 24 is also fed to a rectifier-filter network, and a portion of the peak value of the output is fed back to the gate of field-effect transistor 42 through an appropriate feedback loop 43 in such polarity that an increase in the sensor drive voltage will decrease the overall gain of amplifier 44. A closed-loop system is thus formed to hold the sensor drive voltage constant. A potentiometer 48 controls the amount of feedback through the loop 43 and is used to adjust the sensor drive voltage to 25.000 volts rms. The closed-loop regulator thus described is capable of holding the output to within ± 10 millivolts rms of the set value.

The output voltage of power amplifier 24 is phased by a resistor 50, a capacitor 52, and the impedance of a transformer 54 such that its voltage is in phase with the voltage from the pickup buttons 18 of the sensor. This phased voltage is then used as an unjected carrier, via transformer 54, and as the balancing and calibration voltages through resistors 56 and 60, and potentiometers 58 and 62, and transformer 64.

The voltage from the pickup buttons 18 of the sensor 10 is applied to the differential input of the first stage 66 of amplifier 34. This first stage 66, and its appropriate feedback loops 67 and 68 are chosen to provide a gain of 10 with an input impedance of 200K ohms. A potentiometer 69, in the feedback loop 68, is the common-mode rejection balance and when properly adjusted this stage will provide better than 90 decibels of common-mode rejection. A voltage divider, consisting of resistor 56 and potentiometer 58, provides a balance voltage which is summed into the input of the first stage 66 of amplifier 34 to cancel any stray carrier-frequency voltages appearing at the pickup buttons 18 at zero speed. Likewise, another voltage divider, consisting of resistor 60 and potentiometer 62 provides a calibration voltage which may be summed into the input of the first stage 66 to provide a known calibration step.

The second stage 78, of amplifier 34, and its appropriate feedback loop 79 are chosen to provide a gain which is adjustable from 2 to 4 by a calibrated dial. Thus, the gain can be reset to any previously known value. The output of the system can then be adjusted by this dial to read directly in knots.

The third stage 80, of amplifier 34, and its appropriate feedback loop 81 provide a fixed gain of 5. The output of this stage is capacitively coupled to the signal input of a transformer 82. Capacitive coupling is used in order that any DC offset appearing at the output of the third stage 80 will not cause heavy current to flow and to saturate the amplifier or transformer 82.

The component of the amplified signal, either in phase or 180° out of phase with the injected carrier, is rectified by the ring demodulator 32 consisting of diodes 84, 86, 88, and 90 and resistors 100, 102, 104, and 106. The input signals to the ring demodulator 32 are by means of transformers 54 and 82 which have static shields between the windings. These transformers are chosen with static shields between the windings to avoid any capacitive coupling within the transformers. Further, in order to secure a highly accurate reference point for each drive input to the ring demodulator, the transformer center taps are not used. Instead, precision resistors 92, 94, 96, and 98 are used to secure reference points which are more accurate than the usual transformer center tap.

The action of the ring demodulator 32 is as follows. The injected carrier appears across the resistors 96 and 98. This carrier voltage first causes the junction of resistors 100 and 102 to be held at ground potential while the junction of resistors 104 and 106 floats freely, then on the next half cycle of the injected carrier, the opposite action is obtained. Inspection of the diagram shows that the signal across resistors 92 and 94, which is either in phase or 180° out of phase with the injected carrier, is rectified and appears at half amplitude at the junction of resistors 92 and 94. The amplitude of the injected carrier is chosen to be large in comparison with the expected signal. The diodes thus become switches and the conduction characteristics of the diodes are essentially removed from the operation of the circuit. Ideally, the demodulator 32 would be operated with the injected carrier transformed into a square wave. Using a large injected carrier approaches the ideal condition without the complications of added circuitry. It should be noted that the circuit only responds to the carrier frequency and to odd harmonics thereof wherein response to the third harmonic is about 30 percent of the fundamental with subsequent odd harmonics being even further down. The response of the demodulator 32 to signals generated by sources other than the oscillator 22, which supplies the injected carrier, is very low as a result of the necessity for a constant phase relationship.

In addition, to the excellent rejection of spurious signals provided by the demodulator, further conditioning is provided by utilizing an integrating digital voltmeter 36 such as manufactured by Non-Linear Systems, Inc., which averages the signal for a 10-second time period. This voltmeter contains an extremely linear voltage-to-frequency converter. This frequency is counted for 10 seconds, and thus provides an average value of the input taken over that period. The main advantage of this type of analog-to-digital conversion is that it provides accurate readings in the presence of large values of superimposed noise because the input is integrated over the sampling period. A true average of the input voltage is produced.

As mentioned above, the use of a digital voltmeter automatically results in binary-coded decimal data. The data either can be recorded on tape along with other parameters being measured during a computer for further processing or use with other information. For example, the ship speed could be multiplied by elapsed time to provide the distance traveled through the water from any given starting point.

As can be seen, hereinabove, a relatively simple and compact system has been described which greatly reduces the size and complexity of the standard EM log equipment while maintaining a high degree of accuracy and resolution. Also, the data produced by the system is readily usable in other data processing equipment.

Obviously, many modifications and variations of the present invention are possible in the light of the above teachings. It is therefore to be understood that within the scope of the appended claims the invention may be practiced otherwise than as specifically described.

What is claimed is:

1. A device for measuring the speed of a ship through water, comprising:
   an A.C. source;
   a regulator connected to said A.C. source;
   said regulator including a feedback network having a voltage variable resistor, said voltage variable resistor being responsive to the output of said amplifier for controlling the gain of said amplifier and holding it to a regulated value;
   means for generating a magnetic field, connected to the output of said amplifier, for generating a magnetic field in the water and a voltage corresponding to said magnetic field and responsive to the speed of the field through the water;
   a sensor within said magnetic field for detecting said voltage;
   amplifying means connected to said sensor for amplifying said sensed signals;
   a phasing network connected to said A.C. source for adjusting a phase of said A.C. source to be in phase with the voltage from the sensor;
   a ring demodulator;
   said phasing network having its output connected to the ring demodulator and injecting a carrier into said ring demodulator for demodulating said sensor signal;
   said sensor amplifier output being connected to the input of said demodulator;
   said ring demodulator rectifying the sensor signal and producing an output indicative of the speed of the magnetic field through the water.

2. The device of claim 1 wherein said sensor means are pick-up buttons within said magnetic field for sensing the voltage and producing a signal from said voltage.

* * * * *